UNITED STATES PATENT OFFICE.

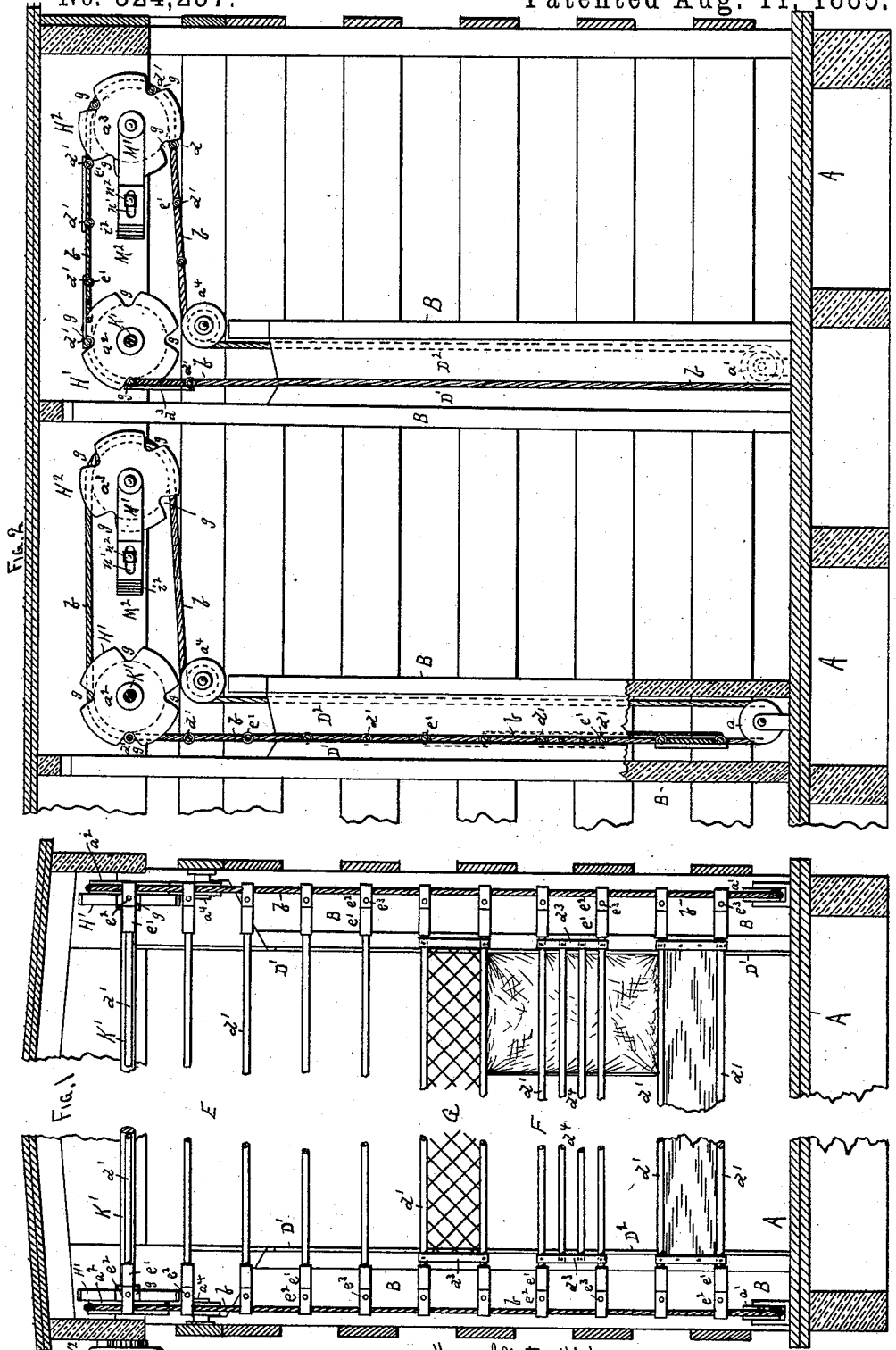

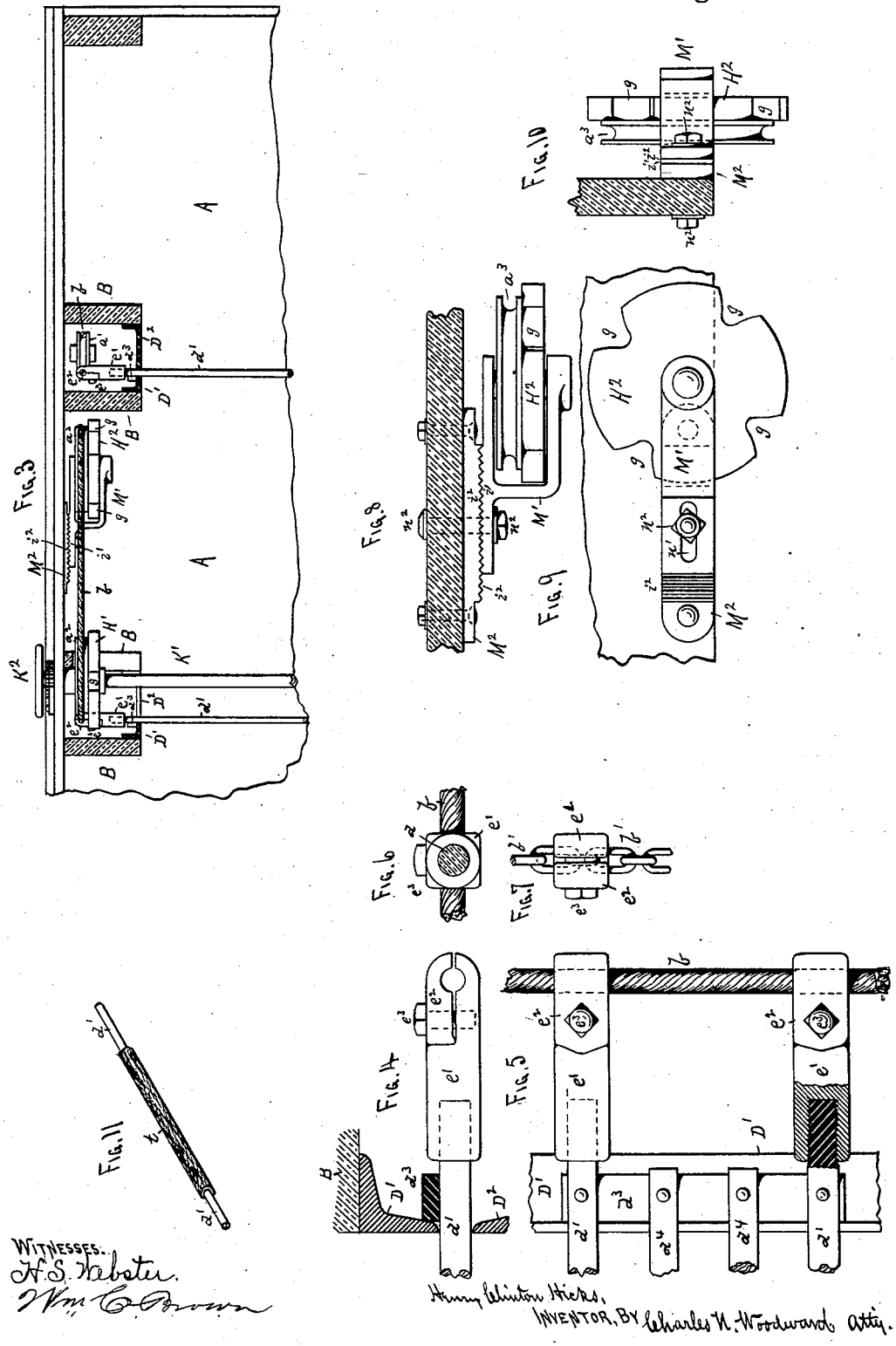

HENRY C. HICKS, OF MINNEAPOLIS, MINNESOTA, ASSIGNOR TO THE AMERICAN LIVE STOCK EXPRESS COMPANY, OF NEW YORK, N. Y.

STOCK-CAR.

SPECIFICATION forming part of Letters Patent No. 324,257, dated August 11, 1885.

Application filed June 5, 1885. (No model.)

*To all whom it may concern:*

Be it known that I, HENRY CLINTON HICKS, a citizen of the United States, and a resident of Minneapolis, in the county of Hennepin and State of Minnesota, have invented certain new and useful Improvements in Stock-Cars, of which the following is a specification.

This invention relates to stock-cars; and it consists in the construction, combination, and arrangement of parts, as hereinafter shown and described.

In the drawings, Figure 1 is a cross-sectional view, and Fig. 2 is a sectional side elevation, of a portion of one end of the car, showing my improvements arranged therein. Fig. 3 is a plan view, in section, of the part shown in Fig. 2. Figs. 4, 5, 6, and 7 are enlarged details of the coupling by which the stall-bars are connected to the elevating cables or chains. Figs. 8, 9, and 10 are enlarged details of the adjustable cable-carrying sheave. Fig. 11 represents a perspective view of a portion of one of the stall-bars covered with rubber or fabric to protect the animals against abrasion.

A is the floor, and B the stanchions or open frame-work of a stock-car, the stanchions being arranged as shown in my Patent No. 288,335, dated November 13, 1883, and adapted to serve as guides to the stall-bars, as shown in said patent.

Between each pair of the stanchions will be arranged the feed-racks and watering-troughs; but as they are not an essential feature of the present invention they are not shown.

The stanchions are arranged in pairs about six inches apart, and each pair of stanchions will be placed about three feet apart from center to center, leaving the stalls for the animals about three feet wide. On the inner faces of each pair of stanchions are arranged angle-iron strips $D'$ $D^2$, the adjacent edges of the angle-irons coming near together and forming guides between which the stall-bars are run up and down.

In the lower edges of each of the compartments formed by each pair of the stanchions, in the rear of each pair of the angle-iron guides, are set small grooved sheaves or pulleys $a'$, and above each of these compartments is a large sheave, $a^2$, with its groove in line with the groove in the sheave $a'$ below it, so that a cable or cord, $b$, will run from the smaller sheave $a'$ in the bottom of the compartment to the larger sheave $a^2$ above the compartment.

In line with the sheave $a^2$, and attached to the frame of the car at some point above each of the stalls between each pair of the stanchions B, is another grooved sheave, $a^3$, over which the cord or cable $b$ from the sheave $a^2$ runs.

Beneath the sheave $a^2$ is another smaller "carrier" or sheave, $a^4$, in line above the small sheave $a'$, over which the cord or cable $b$ runs, and from thence down to the sheave $a'$ again, the four sheaves $a'$ $a^2$ $a^3$ $a^4$ all being in line perpendicularly, so that the cord $b$ will freely run around them in the form of an endless belt, as shown in Figs. 1, 2, and 3. Each side of each car will be provided with a set of these cables $b$ and sheaves $a'$ $a^2$ $a^3$ $a^4$, so that each end of each stall will be provided with its own set of sheaves and cables, the cables being intended to be connected with stall-bars, as shown.

The stall-bars consist of steel rods $d'$, screwed by their ends into clamp $e'$, the latter adapted to be attached to the cable $b$ at suitable intervals. Ordinarily these steel bars will be about six inches apart; but this distance may be varied according to circumstances. The stall-bars $d'$ may be formed entirely of the steel bars, as shown in the upper part of Fig. 1 at E, or the space between every other pair of the bars may be filled in with a wooden or other solid filling, $d^2$, as shown in the lower part of Figs. 1 and 2; or a number of the bars $d'$ may be connected together by short cross tie-bars $d^3$, and these cross tie-bars connected by shorter bars $d^4$, similar to the steel rod $d'$, forming the frame of the bars and parallel with them, as shown at F in Fig. 1; or they may be arranged with a woven-wire or lattice-work filling, as shown at G in Fig. 1, or in any other suitable manner. A portion of the bars $d'$, or all of them, may be covered with rubber, fabric, or other soft substance, $t$, to prevent the abrasion of the animals.

The clamps above mentioned consist of a main portion, $e'$, having the ends of the bars $d'$ screwed into them at one end, while the other end of each clamp is adapted to partially inclasp the cables $b$, and each clamp is provided with a small clamp-plate, $e^2$, adapted to inclasp the other side of the cable and to be fastened to the main portion $e'$ of the clamp by a bolt, $e^3$. By this means the stall-bars may be connected to the cable at any point, and easily and quickly adjusted, or attached to or removed from the cables, as occasion may require. The adjacent surfaces of the clamps $e'$ and plates $e^2$ will be left some distance apart, so that when the bolts $e^3$ are "set up" they will be sure to compress the cable $b$ between the jaws of the clamps and insure the clamps being securely fastened to the cables. The cross tie-bars $d^3$ will be placed upon the stall-bar rods $d'$, between the clamps $e'$ and the angle-iron guides $D'$ $D^2$, so as to form stops to prevent any end movement of the stall-bars. Where the cross tie-bars $d^3$ are not used, then the ends of the clamps $e'$ will be extended, so as to act as stops against the angle-iron guides $D'$ $D^2$. By this simple arrangement the bending of the stall-bars to one side will not draw them inward through the angle-iron guides, as the tie-bars $d^3$ will prevent any such end movement by their contact with the angle-iron guides $D'$ $D^2$.

Alongside of each of the sheaves $a^2$, or formed in one piece therewith, is a peculiar-shaped disk, $H'$, having notches $g$ in its rim, the spaces between the notches being the same distance apart as the spaces between the clamps $e'$. The clamps $e'$ will be made round at those portions of their lengths which come opposite these notches $g$ in the disks $H'$, and the notches will be formed to correspond to the clamps $e'$, so that the clamps will fit into the notches in the disks in the same manner as the links of a chain fit into or over the "sprockets" on a sprocket-gear. In fact, the operation of this disk is the same as a sprocket-wheel upon a chain, the notched disk corresponding to the sprocket-wheel, and the clamps $e'$ and the cables $b$, and their connecting-rods $d'$, forming the chain, the only difference being that the clamps, which correspond to the links of the chain, are farther apart than in an ordinary chain, and the notches $g$ in the disk are placed at a corresponding distance apart.

Alongside each of the sheaves $a^3$ is another notched disk, $H^2$, similar to the notched disk $H'$, into which the clamps $e'$ run when the cables are revolved. By this arrangement it will be seen that if the disks $H'$ $H^2$ and the sheaves be revolved in one direction the stall-bars will run downward until the lower stall-bar reaches the floor A of the car, as shown in Fig. 1 and on the left-hand side of Fig. 2, and then when the disks and sheaves are revolved in the opposite direction the stall-bars will be run upward over the disks along the horizontal section of the cable between the disks $H'$ $H^2$, then around the disks $H^2$, and backward again in a horizontal plane, as shown at the right of Fig. 2, thus elevating the stall-bars and folding them up into the top of the car just beneath the roof and out of the way of the animals being driven into or removed from the car, and also out of the way of freight when the cars are to be used as ordinary freight-cars. By this simple arrangement I am enabled to use ropes or wire cables $b$ to connect the stall-bars $d'$, thereby greatly simplifying and cheapening the construction.

In Fig. 7 a chain, $b'$, is shown held in the clamp $e'$ $e^2$ instead of a rope $b$, as in the other parts of the drawings. This is to show that ordinary chains might be used in place of a rope or cable; but generally I prefer the rope or cable.

The notched disk $H^2$ is not an essential feature of the invention, as the sheave $a^3$ alone would carry the cable $b$ and its attached stall-bars; but the presence of the notched disk renders the action a little more uniform and prevents a large amount of necessary friction and uneven motion to the bars, &c. Each opposite pair of the sheaves $a^2$ and their companion disk $H'$ are mounted upon a shaft, $K'$, which runs through the upper part of the car, and will be provided on each end outside the car with hand-wheels $K^2$ and ratchets and pawls, by which it may be revolved and held at any desired point. By this means both sets of sheaves and disks will be revolved at the same time from the outside of the car, and the stall-bars run upward and downward when required.

The sheaves $a^3$ and disks $H^2$ are each mounted in a small frame, $M'$, having serrations $i'$ on its rear face, adapted to fit into corresponding serrations, $i^2$, on a small plate, $M^2$, attached to the frame of the car. The frame $M'$ has a slot, $n'$, formed in it, through which a bolt, $n^2$, passes, and thence through the plate $M^2$ and into or through the frame of the car. The bolt $n^2$ will be provided with a nut, $n^3$, by which the plate $M^2$ and the frame $M'$ may be firmly clamped together. By this construction the frame $M'$ may be moved along the plate $M^2$, and set at any desired point and held by the serrations $i'$ $i^2$, so as to adjust the sheaves $a^3$ and disks $H^2$ nearer to or farther away from the disks $H'$ and sheaves $a^2$, so as to form an adjustable tension to the cables $b$, to tighten them when first put into the car, or to take up the slack when they become stretched.

Having thus described my invention, what I claim as new is—

1. In a stock-car, a series of endless cables which run over suitable sheaves, and rods connected to each pair of said cables at equal intervals, which rods constitute the stall-bars across the car, in combination with disks or wheels provided with notches in their peripheries, in which notches said rods engage, substantially as set forth, whereby the rotation of said disks elevates and lowers said bars.

2. The combination, in a stock-car, of the stanchions B, arranged in pairs and having a set of sheaves, $a'$ $a^2$ $a^3$ $a^4$, to each pair of said stanchions, an endless cable, $b$, running over each of said sets of sheaves, rods $d'$, connected to said cable by clamps $e'$ $e^2$, and a disk, $H'$, having notches $g$, adapted to engage with said rods $d'$ or their clamps, and means for revolving said disks, substantially as and for the purpose set forth.

3. The combination, in a stock-car, of the stanchions B, arranged in pairs and having the angle-iron guides $D'$ $D^2$, attached to the adjacent faces of each pair of stanchions, a set of sheaves, $a'$ $a^2$ $a^3$ $a^4$, to each pair of said stanchions, an endless cable, $b$, running over each of said sets of sheaves, rods $d'$, connected to said cables by clamps $e'$ $e^2$, and disk $H'$, having notches $g$, adapted to engage with said rods $d'$, or their clamps, and means for revolving said disks, substantially as and for the purpose set forth.

4. The combination, with a stock-car frame composed of floor A, roof C, and stanchions B, arranged in pairs and connecting said floor and roof, a set of sheaves, $a'$ $a^2$ $a^3$ $a^4$, to each pair of said stanchions, endless cables $b$, running over each set of said sheaves, a serrated plate, $M^2$, attached to said car-frame opposite to each of said sheaves $a^3$, and provided with bolt $n^2$, a frame, $M'$, supporting each of said sheaves $a^3$, and having a slot, $n'$, through which said bolt $n^2$ fits, and having serrations corresponding to the serrations in said plate $M^2$, substantially as and for the purpose set forth.

In testimony whereof I have hereunto set my hand in the presence of two subscribing witnesses.

HENRY C. HICKS.

Witnesses:
C. N. WOODWARD,
C. W. CLARK.